United States Patent [19]
Loftus

[11] Patent Number: 4,760,512
[45] Date of Patent: Jul. 26, 1988

[54] CIRCUIT FOR REDUCING TRANSISTOR STRESS AND RESETTING THE TRANSFORMER CORE OF A POWER CONVERTER

[75] Inventor: Thomas P. Loftus, Newark, N.J.

[73] Assignee: American Telephone and Telegraph Company, AT&T Bell Laboratories, Murray Hill, N.J.

[21] Appl. No.: 872,802

[22] Filed: Jun. 11, 1986

[51] Int. Cl.⁴ ............................................. H02M 3/335
[52] U.S. Cl. ........................................ 363/20; 363/56; 363/131
[58] Field of Search ..................... 363/20, 21, 56, 131

[56] References Cited

U.S. PATENT DOCUMENTS

| | | | |
|---|---|---|---|
| 4,268,898 | 5/1981 | Brown | 363/20 |
| 4,365,171 | 12/1982 | Archer | 363/20 |
| 4,441,146 | 4/1984 | Vinciarelli | 363/20 |
| 4,561,046 | 12/1985 | Kuster | 363/21 |
| 4,626,980 | 12/1986 | McGuire | 363/56 |
| 4,652,809 | 3/1987 | Barn | 363/56 |

FOREIGN PATENT DOCUMENTS

| | | | |
|---|---|---|---|
| 31116 | 3/1981 | Japan | 363/21 |
| 79473 | 5/1983 | Japan | 363/20 |

OTHER PUBLICATIONS

Sathe, "Coupled Induction Lossless Snubber Circuit for a Transistor Switching Converter," IBM Tech. Discl. Bul., vol. 26, No. 10A, pp. 5210–5213, Mar. 1984.

Primary Examiner—William H. Beha, Jr.
Attorney, Agent, or Firm—Alfred G. Steinmetz

[57] ABSTRACT

A single ended forward converter includes a snubber/reset circuit that diverts current flow from the power switching transistor during the turn off transition to significantly reduce switching loss therein. This same circuit is further operative to resonate energy stored in the magnetizing inductance of the power transformer with a capacitor during a nonconducting period of the power switching transistor in order to reverse the polarity of current, in the magnetizing inductor and reset the core, and further obtain bipolar flux excursions in the transformer core during each cycle of operation.

14 Claims, 4 Drawing Sheets

CIRCUIT FOR REDUCING TRANSISTOR STRESS AND RESETTING THE TRANSFORMER CORE OF A POWER CONVERTER

FIELD OF THE INVENTION

This invention relates to power supplies and in particular to single ended forward type DC to DC converters. It is specifically concerned with a circuit for facilitating snubbing of the power switching transistor and resetting of the power transformer core.

BACKGROUND OF THE INVENTION

Single ended forward type DC to DC converters require special circuitry to periodically reset the core of the power transformer, since the single switch applies energy to the transformer winding, and hence to the core in one direction only. To maintain a flux balance and prevent the core of the transformer from drifting into saturation, it must be actively reset in each cycle of operation during a nonconducting period of the power transistor switch. To counteract the flux excursion into saturation most reset circuits reset the core magnetizing flux to a zero level and therefore only a unipolar flux swing is utilized.

A DC to DC converter also frequently includes a snubber circuit to reduce switching losses in the power switch during turn off. The loss reduction benefits of the snubber circuit become more critical as the frequency of switching increases since the energy loss in the switch due to turn off is relatively constant per each cycle of operation of the power switch. Hence, as modern converters move to higher operating frequencies, the importance of the snubber circuit increases. These circuits are also operative to reduce the occurrence of voltage spikes across the power switch and thereby reduce its voltage stress and also reduce radiated emission due to spike signal components. Snubber circuits may be either dissipative or nondissipative depending on whether it transfers energy back to the power train or dissipates it.

Meeting the above requirements requires that added circuitry be included in the power train and control circuitry of the single ended forward type converter. This adds to the cost and complexity of the overall circuit and the accompanying increase in component count is detrimental to the overall reliability of the converter.

SUMMARY OF THE INVENTION

A single ended forward type converter embodying the principles of the invention includes a combination snubber/reset circuit that diverts current flow from the power switching transistor during the turn off transition to significantly reduce switching loss and voltage stress therein. This same circuit is further operative to resonate energy stored in the magnetizing inductance of the power transformer with a capacitor during a nonconducting period of the power switching transistor in order to reverse the polarity of current in the magnetizing inductance and reset the core. This resonant action also assures a bipolar flux excursion in the transformer core during each cycle of operation.

This operation of the power transformer with bipolar flux excursions advantageously permits a forward type converter of a given power to operate with a smaller power transformer than is normally required in a conventional forward type converter of the same power rating.

BRIEF DESCRIPTION OF THE DRAWING

An appreciation of the invention may be readily attained by reference to the following specification and the drawing in which.

DETAILED DESCRIPTION

Figure 1:
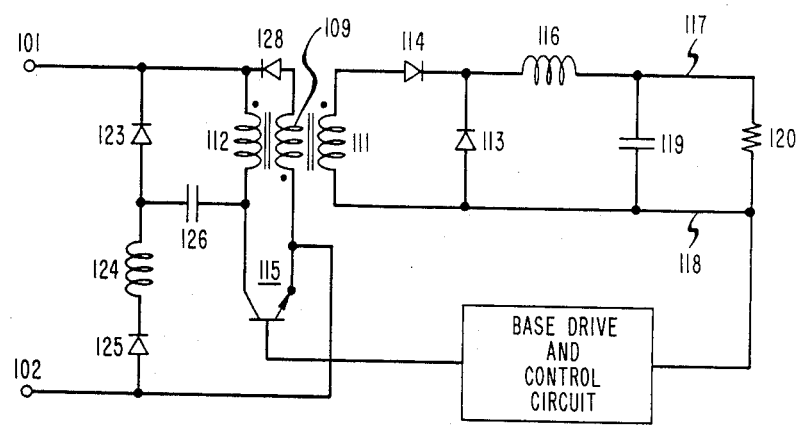
FIG. 1 is a schematic of a forward type single ended converter of the prior art having separate reset and snubbing circuits.

The power train of a single ended forward type converter including conventional snubber and reset circuits is shown in FIG. 1. The power train includes two input terminals 101 and 102 for accepting a DC input voltage whose connection to the primary winding 112 of power transformer 110 is periodically enabled by the switching transistor 115. The output is derived from secondary winding 111 which is coupled through rectifying diode 114 and filter inductor 116 to the output terminals 117 and 118. The power transistor 115 and rectifying diode 114 conduct simultaneously and the output load 120 is supplied through flyback diode 113 during the nonconducting interval. Capacitor 119 shunting load 120 operates to filter the output voltage.

The converter circuit of FIG. 1 includes snubber and core reset circuits typical of the prior art. The snubber circuitry includes a diode 123 and a capacitor 126, both of which cooperate to direct current flowing from the primary winding 112 into capacitor 126 as the power switch 115 is being turned off. The voltage of capacitor 126 is reinitialized, during the subsequent conducting interval of power switch 115, via diode 125, and inductor 123.

The core reset circuitry includes a reset winding 109 magnetically coupled to transformer 110. The diode 128 connected to winding 109 prevents it from conducting when the windings 111 and 112 are both conducting. When the windings 111 and 112 are both nonconducting, winding 109 conducts current flow to reset the core of transformer 110.

Figure 2:
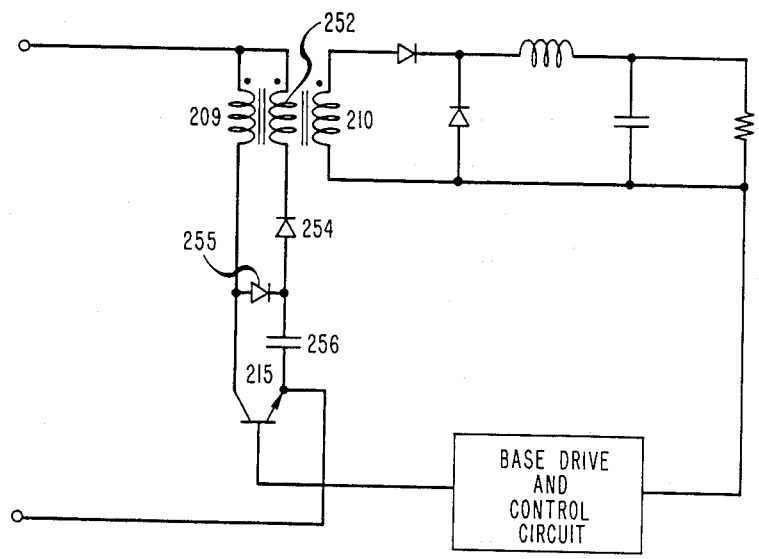
FIG. 2 is a schematic of a forward single ended converter, including a snubber/reset circuit embodying the principles of the invention.

A forward type converter with a combined snubber/reset circuit embodying the principles of the invention is shown in FIG. 2. The snubber/reset circuit includes a power transformer winding 252, a capacitor 256, and the two diodes 254 and 255. Capacitor 256 is connected in series circuit with diode 255 with the series circuit connected to shunt the power switch 215. It is also coupled via diode 254 to the reset winding 252. The reset winding 252 and primary winding 209 preferably have identical number of turns.

Figure 3:
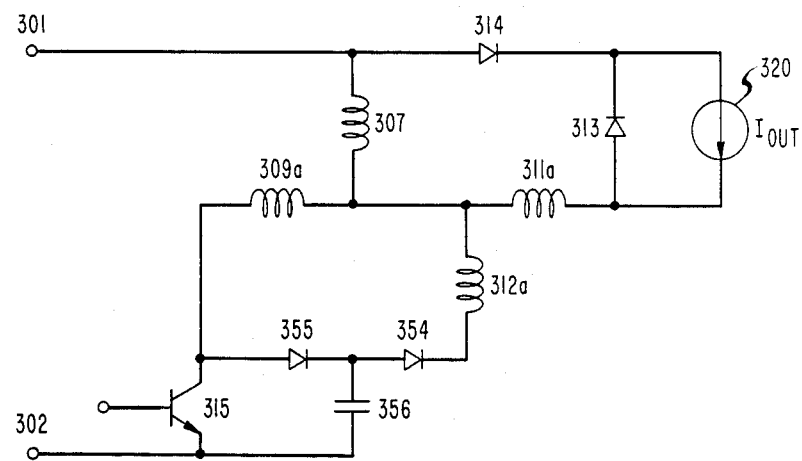
FIG. 3 is a schematic of a circuit electrically equivalent to that of FIG. 2 but depicted in a form to facilitate an explanation of the operation of the circuit disclosed in FIG. 2.
Figure 4:
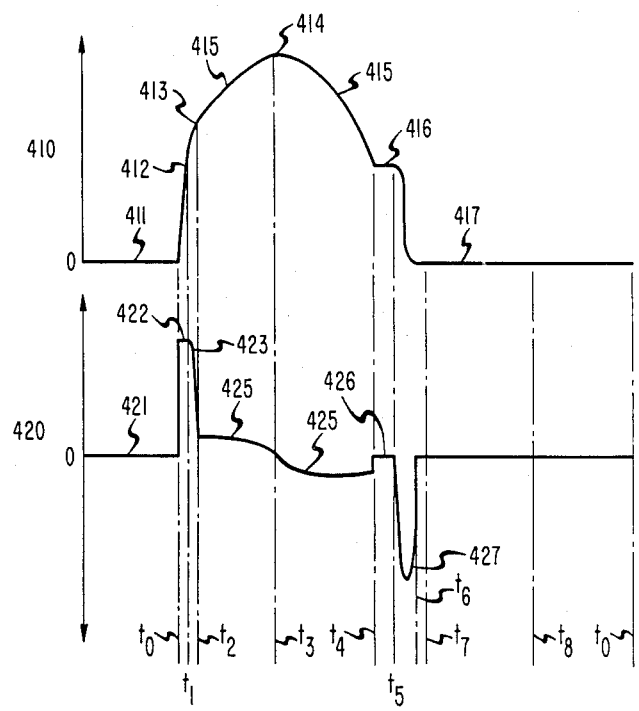
FIGS. 4 and 5 show waveforms useful in explaining the operation of the circuit of FIG. 3.
Figure 5:
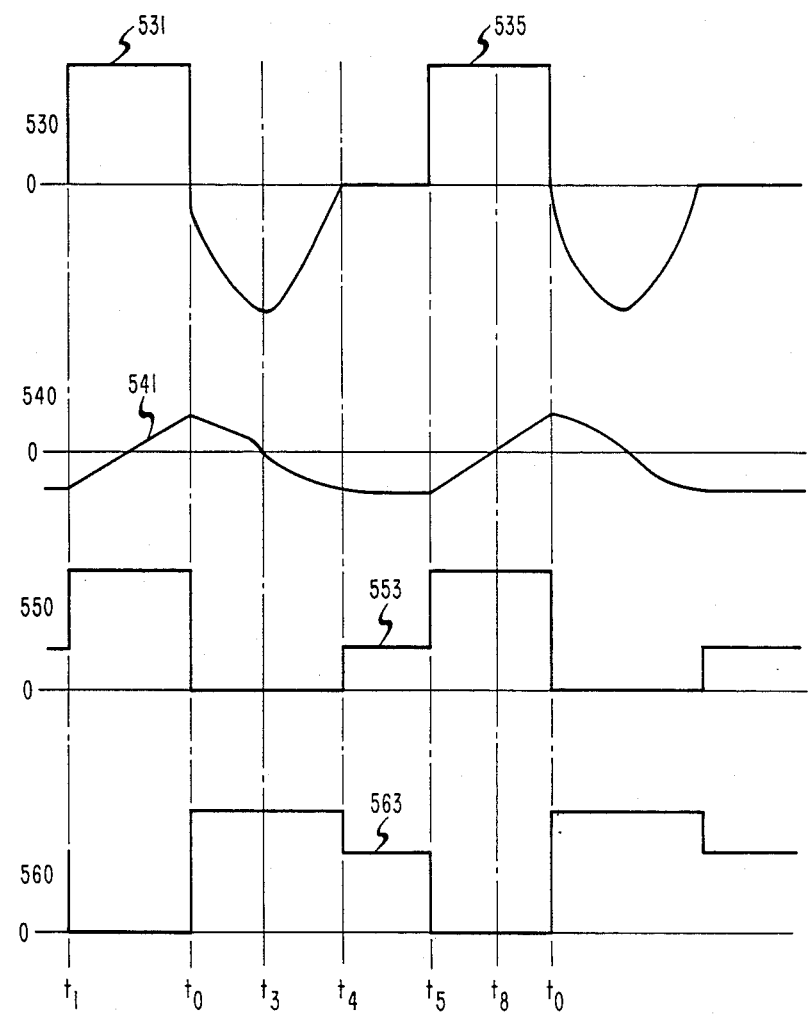

The analysis and explanation of the operation of the circuit of FIG. 2 may be more readily understood by utilizing an equivalent circuit including the essential components and impedances presented in a normalized form such as is shown in FIG. 3 and with reference to the accompanying voltage and current waveforms of FIGS. 4 and 5. Waveforms 410 and 420 in FIG. 4 represent a voltage across capacitor 356 and the current flow therethrough, respectively. The transformer voltage and magnetizing current are shown by waveforms 530 and 540 in FIG. 5. Waveforms 550 and 560 illustrate current in the rectifying diode 314 and flyback diode 313, respectively. The equivalent circuit of FIG. 3 assumes a transformer in which all the windings have the same number of turns, and hence the windings per se are not shown. The leakage inductances of all the windings are shown as the inductances 309a, 311a, and 312a for the primary winding, the secondary winding and the reset windings, respectively. The output load of the converter is shown as a constant current sink 320 which approximates the normal continuous current output of a forward converter due to its inductive output filter. The magnetizing inductance of the transformer is shown as a separate inductor 307.

The snubber/reset circuit as shown comprises the capacitor 356, the diodes 354 and 355, and a reset winding 312 (as shown in FIG. 2). Inductor 312a is the leakage inductance of winding 252. Capacitor 356 and diode 355 operate as a snubber by diverting current flow from power transistor 315 during a turn off transition to eliminate switching loss therein. Capacitor 356 operates through diodes 354 and 355 and the leakage inductances 309a and 312a to reset the current in inductor 307 and thereby reset the core of the power transformer 210 (shown in FIG. 2). The energy stored in the magnetizing inductance 307 is resonant with the capacitor 356 during the off time of transistor 315 so that the polarity of the current in the magnetizing inductance 307 is reversed, thereby causing the flux excursion in the transformer core to be bipolar and thereby assure core reset in each cycle of operation of the converter. Operation of the snubber/reset circuit may be explained by describing a typical cycle of operation which is assumed to begin prior to time $T_0$ (FIGS. 4 and 5) while the power switch 315 is conducting.

During the on time of transistor 315 prior to time $T_0$ (shown in FIGS. 4 and 5) and after the previous turn on transient has subsided the voltage drops across the leakage inductances 309a, 311a, and 312a are essentially zero. The rectifying diode 314 is conducting and the diodes 313, 354, and 355 are biased nonconducting. Since the DC input voltage across input terminals 301 and 302 is impressed across the magnetizing inductance 307 as shown by level 531 of waveform 530 in FIG. 5 and, the magnetizing current is increasing with a steady slope as shown by line 541 of the magnetizing current waveform 540 as shown in FIG. 5. The voltage across the capacitor 356 is essentially zero up to time $T_0$ as shown by line 411 in waveform 410 in FIG. 4, and the current flow in capacitor 356 as shown by line 421 in waveform 420 for the same time interval in FIG. 4 is also zero.

At the time $T_0$ designated in FIGS. 4 and 5, the transistor 315 is biased so as to begin a transition from its present conducting state to a nonconducting state. As the transistor 315 starts to turn off, its collector to emitter voltage, begins to rise from its near zero value and the diode 355 becomes forward biased and begins to conduct. The current that was previously flowing through the primary winding 209 (FIG. 2) and power transistor 315 now begins to flow through the diode 355 into the capacitor 356 bypassing the power transistor 315. This current, shown by current pulse 422 in waveform 420 in FIG. 4 extending from time $T_0$ to $T_1$, charges the capacitor 356 at a constant rate and causes a linear ramp voltage rise across the capacitor 356 as shown by line 412 in waveform 410 in FIG. 4. This waveform continues to rise until a value equaling the DC input voltage is reached at time $T_1$.

During the interval $T_0$–$T_1$ the snubbing action of capacitor 356 is operative as current flows to the capacitor rather than through power transistor switch 315, and hence snubs the undesirable turn off transistor stress. The voltage rise is linear since the magnetizing current in the magnetizing inductor 307 and the current through current source 320 are both essentially constant during this interval.

At the time $T_1$ both diodes 354 and 355 are biased conducting as the voltage across capacitor 356 now continues to increase sinusoidally to a value equaling the input voltage plus a value determined by the output current and characteristic impedance of the circuit.

Between times $T_1$ and $T_2$ the current through capacitor 356 begins to decrease as shown by the decreasing curve 423 in waveform 420 in FIG. 4 and the capacitor is essentially ringing with the leakage inductances 309a, 311a and 312a for a one quarter cycle interval. Finally at time $T_2$ and the current in leakage inductance 311a drops to zero and the rectifying diode 313 becomes nonconducting.

From time $T_2$ to time $T_4$ the capacitor 356 rings with the magnetizing inductance 307. The leakage inductances have negligible effect on the circuit operating during this interval. The voltage across capacitor 356 has a sinusoidal waveshape 415 and the current passing through assumes a cosine waveshape 425.

The voltage resonates to its peak value 414 at time $T_3$ while the current in the secondary leakage inductor 311a resonates to zero at time $T_3$.

During the time interval $T_2$–$T_4$ the current through capacitor 356 is essentially equal to the magnetizing current through magnetizing inductance 307. The rectifying diode 314 functions as a clamp preventing the transformer voltage from reversing polarity.

At the occurrence of time $T_4$ the rectifying diode 314 begins to conduct as shown by current step 553 of waveform 550 in FIG. 5. The flyback diode 313 also continues to conduct from the interval $T_4$–$T_5$ as shown by level 563 of waveform 560. By time $T_4$ the capacitor 356 has ceased ringing and current mainly circulates through inductances 307, 311a, diode 314 and diode 313. The current in the capacitor 356 is equal to zero as shown by level 426 in waveform 420 and its voltage is at the value of the DC input voltage during the interval $T_4$–$T_5$ as shown by level 416 in waveform 410.

Current circulation continues until time $T_5$ at which point the power transistor switch 315 is again turned on whereupon the input voltage is impressed across the primary winding as shown by voltage level 535 in waveform 530 and the current in the capacitor is a negative current pulse 427 in waveform 420 which causes the voltage across the capacitor 356 to decay to zero level 417 in waveform 410. Current pulse 427 is a half cycle resonant pulse and is due to the resonance of capacitor 356 with leakage inductors 309a, 311a, and 312a.

At higher values of output current, diode 354 prevents current pulse 427 from ringing negative. This will prevent losses due to circulating current in inductors 309a and 312a, and diode 355.

At lower values of output current, the current through leakage inductor 312a will be positive when the voltage across capacitor 356 rings negative causing diode 355 to conduct. In this case, diode 354 does not prevent the circulating current flow through inductors 309a and 312a, and diodes 355 and 354. Therefore, for lower current applications, diode 354 does not prevent losses and therefore in these applications, this diode may be replaced by a short circuit without adversely affecting circuit operation. The current path of the current pulse 427 is from capacitor 356 through diode 354 inductances 309a and 312a and power switch 315. The current resets capacitor to a zero voltage so that it may function as a turn off snubber when the next turn off of the power transistor switch occurs.

Figure 7:
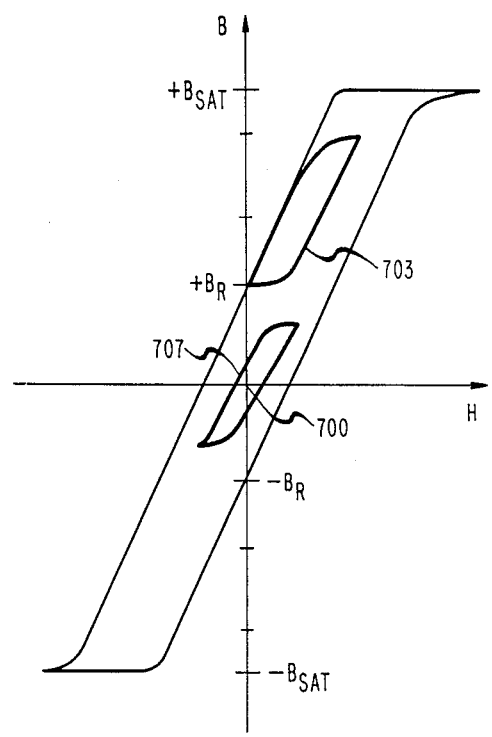

The ringing currents flowing during the interval $T_2$–$T_4$ as described above performs the desired core reset function. The reversal of current in the magnetizing inductance 307 not only resets the core of the transformer, but causes the flux excursions of the core to be bipolar as shown in FIG. 7, wherein the hysteresis curve 707 followed by flux excursions in the transformer core is symmetrical around the zero axis point 700 of the graph 701 as compared with a hysteresis loop 703 for a conventional forward converter with conventional reset circuit.

Figure 6:
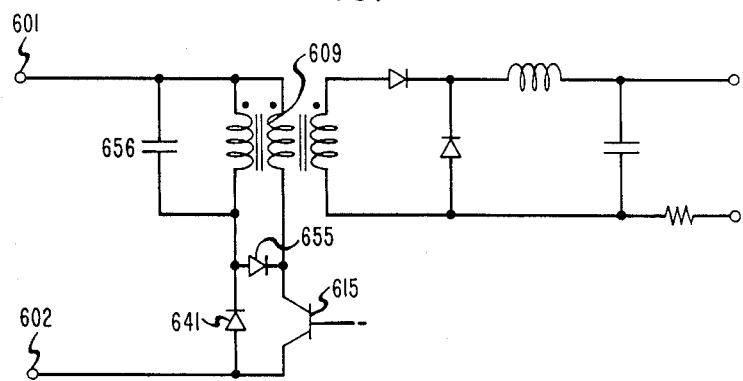
FIG. 6 is a schematic of an alternate embodiment of a snubber reset circuit embodying the principle of the invention, and FIG. 7 discloses a BH loop useful in comparing a forward type converter embodying the principles of the invention with a conventional forward type converter.

Another embodiment of the snubber/reset circuit is disclosed in FIG. 6 in which the circuit is embodied in another topological configuration but with the operation substantially the same as that of the circuit of FIG. 2. The topological differences include connecting capacitor 656 to the positive input terminal 601, connecting the capacitor 656 directly to a reset winding 609 and connecting diode 641 across capacitor 656 to input terminal 602 to prevent ringing with the parasitic inductances of the power switch 615.

What is claimed is:
1. A forward type converter circuit, comprising:
 a power transformer having a magnetizing inductance and including a primary winding, a secondary winding, and a rest winding,
 an input for accepting a DC voltage,
 a transistor switch coupling the input to the pirmary winding,
 means for switching the transistor switch at a first frequency,
 an output for coupling to a load,
 a rectifying switch coupling the secondary winding to the output,
 a first diode switch connected in series with the rest winding,
 a capacitor coupled to the reset winding and having a capacitive magnitude so as to be operative to resonate with the magnetizing inductance for a full half cycle of the first frquency when the transistor switch is nonconducting, in order to reset a core of the power transformer with a flux excursion such that a setting-resetting operation is bipolar in a BH plane and the capacitor further being coupled to the transistor switch through a second diode switch and operative to divert current from the transistor switch during its transition from conduction to nonconduction.

2. A forward type converter circuit as defined in claim 1 wherein;
 the second diode switch is connected to a circuit node connecting the transistor switch and the primary winding.

3. A forward type conveter circuit as defined in calim 2 wherein;
 the capacitor is connected to a circuit node common to the transistor switch and a terminal of the input.

4. A forward type converter circuit as defined in claim 1 wherein;
 the capacitor, the reset winding, and the first diode switch are connected in series and interconnecting two terminals at the input.

5. A forward type converter circuit as defined in claim 1 wherein;
 the first diode switch and reset winding are connected in series connected with one end of the series connector connected to a terminal at the input and another end of the series connection is connected to a circuit node common to the capacitor and the second diode switch.

6. A forward type converter circuit as defined in claim 1 wherein;
 the primary winding and the reset winding have an identical number of turns.

7. A forward type converter circuit as defined in claim 1,
 wherein the capacitor and second diode switch form a first series connection and the first series connection is connected in shunt with a main conduction path of the transistor switch and
 the capacitor and first diode switch form a second series connection and the second series connection is connected in series with the reset winding.

8. A forward type converter as defined in claim 1 wherein;
 the reset winding is connected to a circuit node common to the capacitor and the second diode switch.

9. A converter circuit comprising:
 a power transformer having magnetizing inductance and including a primary winding, a secondary winding, and a reset winding
 input means for accepting a DC voltage,
 output means for accepting a load to be energized
 a power switch coupling the input means to the primary winding,
 means for driving the power switch at a first frequency,
 rectifying means and filter means for coupling the secondary winding to the output means, the rectifying means being contemporaneously conductive and nonconductive with the power switch,
 a charge storage means, a first switch for diverting current in the primary winding from the power switch to the charge storage means as the power switch is turning off, a second switch for coupling the charge storage means to the reset winding when the power switch is nonconducting, the charge storage means having a capacitance value selected to resonate with the magnetizing inductane of the power transformer for a full half cycle during an off time of the power switch so as to reverse a direction of magnetizing current while the power switch is nonconducting such that a peak magnitude of reverse current equals a peak magnitude of forward current in order to provide bipolar flux excursions in setting and resetting the power transformer.

10. A converter circuit as defined in claim 9 wherein, the first switch is a first diode coupling the primary winding to the charge storage means and the second switch is a second diode coupling the reset winding to the charge storage means.

11. A converter circuit as defined in claim 10 wherein;
the first diode and charge storage means forms a series connection connected in shunt with the power switch.

12. A converter circuit comprising:
a power transformer including a primary winding, a secondary winding, and a reset winding
input means for accepting A DC voltage,
output means for accepting a load to be energized
a power switch coupling the input means to the primary winding,
rectifying means and filter means for coupling the secondary winding to the output means, the rectifying means being contemporaneously conductive and nonconductive with the power switch.
a charge storage means, a first diode switch connected in series connection with the charge storage means and the series connection being connected in shunt with the primary winding and operative for diverting current in the primary winding from the power switch to the charge storage means as the power switch is turning off, a second diode switch for coupling the charge storage means to the reset winding when the power switch is nonconducting, the charge storage means having a capacitance value selected to resonate with a magnetizing inductane of the power transformer at an operating frequency of the converter as to reverse a direction of magnetizing current while the power switch is nonconducting.

13. A converter circuit as defined in claim 12 wherein;
the reset winding is directly connected to the charge storage means.

14. A forward type converter circuit, comprising:
a power transformer including a primary winding, a secondary winding, and a reset winding,
an input for accepting a DC voltage,
a transistor switch coupling the input to the primary winding,
an output for coupling to a load,
a rectifying switch coupling the secondary winding to the output,
first diode switch connected in series with the reset winding,
a capacitor coupled to the reset winding and to a terminal of the input separated from the transistor switch, the capacitor being operative to resonate with the reset wining in order to reset a core of the power transformer, and the capacitor being further coupled to the transistor switch through a second diode switch and operative to divert current from the transistor switch during its transition from conduction to nonconduction and further assist in resetting the core of the power transformer.

* * * * *